(12) United States Patent
Bewersdorf et al.

(10) Patent No.: US 7,333,207 B2
(45) Date of Patent: Feb. 19, 2008

(54) CONFOCAL 4-PI MICROSCOPE AND METHOD FOR CONFOCAL 4-PI MICROSCOPY

(75) Inventors: Jörg Bewersdorf, Göttingen (DE); Hilmar Gugel, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 97 days.

(21) Appl. No.: 10/541,700

(22) PCT Filed: Jan. 6, 2004

(86) PCT No.: PCT/EP2004/000029

§ 371 (c)(1),
(2), (4) Date: Jul. 7, 2005

(87) PCT Pub. No.: WO2004/061513

PCT Pub. Date: Jul. 22, 2004

(65) Prior Publication Data

US 2006/0114466 A1    Jun. 1, 2006

(30) Foreign Application Priority Data

Jan. 7, 2003  (DE) ............................... 103 00 157

(51) Int. Cl.
*G01B 9/02* (2006.01)
*G01J 3/45* (2006.01)
(52) U.S. Cl. .................................................... 356/451
(58) Field of Classification Search ................ 356/301, 356/451, 456
See application file for complete search history.

(56) References Cited

U.S. PATENT DOCUMENTS

| 6,552,795 | B2 * | 4/2003 | Bewersdorf ................. 356/450 |
| 6,738,190 | B2 | 5/2004 | Engelhardt et al. |
| 6,891,670 | B2 | 5/2005 | Gugel et al. |
| 2002/0027709 | A1 | 3/2002 | Engelhardt |
| 2002/0109913 | A1 * | 8/2002 | Gugel et al. ................. 359/387 |

FOREIGN PATENT DOCUMENTS

| DE | 4331570 | 3/1995 |
| DE | 10010154 A1 | 9/2001 |

(Continued)

OTHER PUBLICATIONS

Hell, S. et al. Properties of a 4Pi Confocal Fluorescence Microscope. Journal of the Optical Society of America, Dec. 1, 1992, pp. 2159-2166, vol. 9, No. 12, Optical Society of America USA.

*Primary Examiner*—Michael A. Lyons
(74) *Attorney, Agent, or Firm*—Houston Eliseeva LLP (57) ABSTRACT

The invention relates to a confocal $4\pi$ microscopy method which is characterized by coherently illuminating a sample from two sides by one objective each with illumination light which has at least one illumination wavelength whereby a stationary illumination wave having a main illumination maximum and secondary illumination maxima is produced by interference of the illumination light in the sample. The detection light emitted by the sample has at least one detection wavelength and is detected through the two objectives. The detection light is made to interfere, thereby producing in the sample a detection pattern having a main detection maximum, secondary detection maxima and detection minima in such a manner that the secondary illumination maxima and the detection minima overlap at least partially.

21 Claims, 6 Drawing Sheets

FOREIGN PATENT DOCUMENTS

| | | |
|---|---|---|
| DE | 10043992 A1 | 3/2002 |
| DE | 10107095 A1 | 8/2002 |
| EP | 0491289 B1 | 6/1992 |
| EP | 0807814 | 11/1997 |

* cited by examiner

CONFOCAL 4-PI MICROSCOPE AND METHOD FOR CONFOCAL 4-PI MICROSCOPY

CROSS-REFERENCE TO RELATED APPLICATIONS

This application is a national stage of PCT application serial number PCT/EP04/000029 filed on Jan. 6, 2004, which claims priority to German application serial number DE 103001573 filed on Jan. 7, 2003, both of which are incorporated herein by reference in their entirety.

BACKGROUND OF THE INVENTION

The invention relates to a method for confocal 4-pi microscopy.

The invention furthermore relates to a confocal 4-pi microscope with a light source that produces an illumination light that exhibits at least one illumination wavelength, and that is directable from two sides by one objective each onto a sample, whereby a stationary illumination wave having a main illumination maximum and secondary illumination maxima is produced by interference of the illumination light in the sample, and having a detector to detect detection light emitted by the sample that passes through both objectives and that exhibits at least one detection wavelength.

A sample is illuminated with a light beam in scanning microscopy in order to observe the reflected or fluorescent light emitted by the sample. The focus of an illumination light beam is moved in an object plane with the help of a controllable beam deflector, generally by tilting two mirrors, in which case the deflection axes are most often perpendicular to each other so that one mirror deflects in x-direction and the other in y-direction. The mirrors may, for example, be tilted with the help of galvanometric positioners. The power of the light coming from the object is measured, depending on the position of the scanning beam. Generally, the positioners are equipped with sensors to determine the current position of the mirror.

In confocal scanning microscopy specifically, an object is scanned in three dimensions with the focus of a light beam. In general, a confocal scanning microscope comprises a light source, a focusing optic with which the light from the light source is focused on a pinhole aperture—the so-called excitation aperture—, a beam splitter, a beam deflector to control the beam, a microscope optic, a detection aperture, and detectors to detect the detection and/or fluorescent light. The illumination light is coupled by a beam splitter. The detection light emitted by the object, such as fluorescent or reflected light or even CARS light, returns to the beam splitter via the beam deflector, passes through it, and is finally focused on the detection aperture, behind which are located the detectors. Detection light that does not originate directly from the focus region takes another light path and does not pass through the detection aperture, so that one obtains point information that results in a three-dimensional image when the object is scanned sequentially. Most often, a three-dimensional image is achieved by taking layers of image data, in which case the path of the scanning beam ideally describes a meandering pattern on or in the object. (Scanning a line in x-direction at a constant y-position, then continuing x-scanning and by y-shifting to the next line to be scanned, scanning this line in a negative x-direction at a constant y-position, etc.). To enable layered data imaging, the sample table or the objective is shifted after scanning one layer so that the next layer to be scanned is brought into the focal plane of the objective.

Increasing resolution in the direction of the optical axis may be achieved by a double-objective arrangement as described in European patent EP 0 491 289 with the title "Double-confocal scanning microscope." The light coming from the illumination system is split into two partial beams that illuminate the sample simultaneously in that they run in opposite directions to each other through two objectives that are arranged in mirror symmetry. The two objectives are arranged on different sides of their common object plane. An interference pattern, which exhibits one main maximum and several secondary maxima during constructive interference, is formed in the object point as a result of this interferometric illumination. Here, the secondary maxima are generally arranged along the optical axis. Increased axial resolution can be achieved with a double-confocal scanning microscope in comparison to a conventional scanning microscope by interferometric illumination.

The secondary maxima produce disturbing double images during imaging, which must be removed using mathematical image reconstruction methods. The lower the secondary maxima, the better these methods work. It has been shown in practice that artifact-free reconstruction can be achieved only when the amplitudes of the secondary maxima are at most 50% of the amplitude of the main maximum. However, the single-photon excitation preferred in confocal microscopy generates secondary maxima of approximately 65% level in a standard 4-pi microscope and therefore cannot be used for imaging requiring structural resolution.

A method and a device to illuminate a transparent object, especially for use in the double-confocal scanning microscopy is known from published German patent application DE 100 10 154 A1, in which to illuminate a point of the object two light waves running in opposite directions from a coherent light source (focused on the point) interfere creating an illumination pattern, and in which avoidance of the problem of reconstruction is characterized in that at least two additional converging coherent light waves overlap in order to minimize the secondary maxima of the illumination pattern.

A double confocal scanning microscope with an illumination beam path, a light source, and a detection beam path of a detector is known from published German patent application DE 101 07 095 A1. The double confocal scanning microscope is characterized in that to avoid the cause of the problem of the reconstruction methods at least one optical component is provided that acts on the illumination and/or detection beam path and is configured such that it affects the amplitude and/or the phase and/or the polarization of the light, thereby making changeable the characteristics of the double confocal illumination and/or detection.

BRIEF SUMMARY OF THE INVENTION

The task underlying the invention is therefore to suggest a confocal 4-pi microscopy procedure that simply and efficiently avoids the image artifacts caused by the secondary maxima.

The task is solved by a method characterized by the following steps:

Coherent illumination of a sample from two sides by one objective each with illumination light that has at least one illumination wavelength, whereby a stationary illumination wave with one main illumination maximum and with secondary illumination maxima is produced by interference of the illumination light in the sample, and Detection of the detection light emitted by the sample that exhibits at least one detection wavelength, that passes through the two objectives, whereby the detection light is made to interfere, thereby producing in the sample a detection pattern with one main detection maximum and with secondary detection maxima produced such that the secondary illumination maxima and the secondary detection maxima are located in different places.

Furthermore, it is a task of the invention to describe a confocal 4-pi microscope in which the imaging artifacts caused by the secondary maxima are efficiently avoided.

This task is solved by a confocal 4-pi microscope characterized in that the detection light interferes and in that a detection pattern with one main detection maximum and with secondary detection maxima can be produced in the sample, whereby the secondary illumination maxima and the secondary detection maxima are located in different places.

The invention has the advantage that improved image quality can be achieved with confocal 4-pi microscopy. Because the detection light is made to interfere thereby producing a detection pattern in the sample with one main detection maximum, secondary detection maxima, and detection minima in such a manner that the secondary illumination maxima and the detection minima overlap at least partially—otherwise the secondary illumination maxima and the secondary detection maxima would not be located in different places—, the areas of the sample that are excited by the secondary illumination maxima are either not detected or are at least detected with less sensitivity.

In 4-pi microscopy, a stationary wave is produced in the common focus of the objectives by the coherent illumination of two objectives that are opposite each other. This stationary wave modulates axially the point spread function (PSF) of the ordinary confocal microscope and produces several maxima as a result with a 4- to 7-fold lower half-width. As a result, axial resolution is increased correspondingly by this factor compared to an ordinary confocal laser scanning microscope when using an objective with the highest numeric aperture. Now when both the excitation light and the detection light interfere with each other through both objectives, new possibilities emerge for modulating PSF. According to the invention, it has been recognized that the spacing between the secondary maxima and the main maximum is proportional to each wavelength. For example, by using different wavelengths for detection and illumination, the secondary maxima of the illumination PSF and the detection PSF can, according to the invention, be made to overlap only slightly. The effective PSF that results from the product of both PSFs possesses reduced secondary maxima as a result. If the detection wavelength is, for example, approximately 50% higher than that of the illumination wavelength, the secondary detection maximum coincides with the second minimum of the illumination PSF and is therefore massively suppressed. The secondary maxima can therefore be lowered in practice to approximately 30% of the value of the main maximum.

The optical transfer function (OTF) of the 4-pi confocal microscope during single-photon excitation possesses more marked minima at the critical space frequency $k_c$, which lies between the main maximum and the first secondary maximum, than the OTFs of 4-pi confocal two-photon technologies. In the image restorations that are most frequently required, the signal must be strengthened at these space frequencies in particular. As a result, at a poor signal-to-noise ratio, these regions of the space frequency spectrum are particularly susceptible to producing disturbing artifacts that make image interpretation difficult and even impossible.

In a preferred embodiment of the invention, the spatial position of the secondary illumination maxima and/or the secondary detection maxima are set and/or changed by introducing pupil filters on at least one pupil plane of the objective or on at least one plane corresponding optically to the pupil plane. The 4-pi PSF can be changed by introducing pupil filters. In particular, secondary maxima can be shifted somewhat in this manner. Pupil filters are particularly advantageous in two-photon excitation. In single-photon excitation they lead to particularly good suppression of disturbing effects caused by secondary illumination maxima, particularly in combination with the capacity to select an illumination wavelength to detection wavelength ratio in a range between 0.5 to 0.9, especially in a range between 0.7 to 0.8, especially at 0.75.

The OTF of a microscope can be optimized by a change in the pupil function. By emphasizing the regions with extreme $k_z$, values, that is, the outermost ring as well as the center of the pupil, the OTF is leveled out accordingly. The question is, what are the optimal pupil function values, and whether other less evident functions might not deliver better results.

The principle of structured pupil functions to increase resolution was researched as early as the early 1950s by G. Toraldo di Francia in bright-field microscopy. One can imagine the filter optimization process within the spatial domain by dividing the aperture of the objective into concentric rings. Corresponding to its radius, each of the rings produces different lateral space frequencies in the focal plane. By using the appropriate combination of two rings, a point at a distance p from the center of the PSF can be achieved such that it is, on the one hand, a part of the nth diffraction maximum of one of the rings and, on the other hand, belongs to the n+(2m+1)th diffraction maximum of the other ring. In this case, the amplitudes of both diffraction maxima are opposite each other, and as a result the selection of suitable ring widths or amplitudes can completely extinguish the electromagnetic field emitted from this point.

In this manner, successive neighboring radii can be minimized. Theoretically, very sharp field distributions can be created around the origin, whose ring-shaped surround can be decreased to zero as needed within a freely selectable region by using these so-called Toraldo filters. However, the signal from the center also decreases drastically in the process. Regions outside the optimized region, on the other hand, are diffracted strongly into the internal region and at the corresponding brightness distribution can easily exceed the signal in the center. As a result, an experimentally achievable limit can be quickly reached.

In principle, not only the amplitude, but also the phase of the electromagnetic field can be changed by the pupil function. Phase-delaying elements such as phase plates, particularly λ/2 plates, are used for the purpose in a practical application. Furthermore, the principal can easily be expanded to the third dimension at the expense of the two lateral dimensions.

There is a potential for application in confocal microscopy to the extent that, for example, the bright outer regions of the excitation PSF can be suppressed with Toraldo filters by the confocal detection PSF. The effects that can be achieved there, however, only affect a percentage range so that in most cases the disadvantages of the Toraldo approach outweigh the advantages.

The purpose of Toraldo filters in 4-pi confocal microscopy is not primarily to increase resolution. Rather, the goal is to reduce the secondary maxima in the PSF, and in so doing to raise the weak regions of the OTF by the critical frequency $k_c$. The procedure is analogous. However, it can operate on a relatively limited axial region, as a result of which the negative side effects are not as drastic.

The sample is preferably marked with at least one luminescent dye, particularly with a fluorescent dye. In a preferred embodiment, the fluorescent dye is selected such that an illumination light wave to detection light wave ratio may be set in a range from 0.6 to 0.8, particularly in a range from 0.6 to 0.9, particularly at 0.75. To this end, with regard to the confocal 4-pi microscope, at least one detection wavelength should be selectable, and the detector should be adjustable to the selected detection wavelength. In a variant, the detector is designed as a multi-band detector because this is particularly flexible and advantageously utilized with regard to the method according to the invention and with regard to the microscope according to the invention. It is also envisaged that a minimum of one, preferably free illumination wavelength be selectable and that the light source be adjustable to the selected illumination wavelength.

The fluorescent dye preferably exhibits an excitation and an emission region, whereby the illumination wavelength lies in the short wave length portion of the excitation region and/or the detection wavelength in the long wave length portion of the emission region.

The Stokes shift, which is accessible in practice, is very limited in some dyes. A few green-emitting dyes exhibit a difference of approximately 20-30 nm between the excitation and emission maximum. During excitation and in the fluorescence spectrum, the spectral bandwidth is approximately 50 nm, respectively. If one forgoes the larger portion of high-frequency florescent light and in addition uses the dye in the difficult to excite blue-shifted excitation spectrum, a Stokes shift of approximately 120 nm can be achieved. Red dyes typically exhibit a greater Stokes shift. It is also possible to use a large anti-Stokes shift; however, this approach often fails in the small overlap region of the excitation and emission spectra. Several dyes are available that exhibit an acceptable Stokes shift or a very broad-band emission spectrum in the blue-green region during excitation.

The efficiency trade-off when using a small section of the fluorescence spectrum is usually tolerable, particularly when one compares it to two-photon excitation according to the invention that is also possible, which has a lower output than confocal microscopy with single-photon excitation because of photobleaching. For multiple-photon excitation, the light source is preferably a pulse laser.

In a preferred development, the illumination light exhibits a further illumination wavelength, in which case excitation occurs via a virtual or via a real intermediate level.

In a preferred variant, excitation occurs via a higher excitation level, especially via an $S_0$-$S_2$ transition. This is an alternative that is not based on a limitation in the fluorescence spectrum. Usually, a beamless relaxation transition from the $S_2$ to the $S_1$ state occurs before fluorescence. This results in a very large Stokes shift. The applicability of this method depends on the extent to which bleaching is intensified by this relatively high-energy excitation.

The anti-Stokes range of a dye may be more easily exploited by artificially boosting the molecules from the normal vibrational state of the normal electronic $S_0$ state to a higher vibrational state. Once the dyes have been brought from this excited state into the S1 state, and, according to the invention, one detects only the high-frequency fluorescent light resulting from decay into a lower state, the wavelength of the fluorescent light is of a significantly longer wavelength than that of the excitation light. Excitation of these vibrational states is possible using infrared radiation.

In another variant, excitation of the sample comprises a Forster-resonant energy transfer (FRET) within the sample. Coupled dyes are used for this purpose, in which a high-energy excitable dye (the donor) gives off the excitation energy by means of resonant energy transfer to a dye of lesser energy (the acceptor), which then fluoresces strongly in the red-shifted range. The use of a dye chain that utilizes multiple coupling is also possible. Forster-resonant energy transfer (FRET) between two dye molecules is being used to determine spacing between these molecules in what are now widespread FRET experiments. In practice, transfer efficiencies approaching 100% are being achieved. In contrast to these experiments, permanent coupling is needed in the case of 4-pi. However, this is possible in principle, using an antibody that specifically bonds these two dye molecules.

The confocal 4-pi microscope preferably exhibits a detection pinhole aperture with an aperture diameter smaller than 1 Airy disc, particularly an aperture diameter of 0.7 to 0.8 Airy discs. By paying particular attention to the size of the detection pinhole aperture, the secondary maxima can, according to the invention, be reduced, and in turn the Stokes shift requirements of the fluorescent dye may be reduced as well. In contrast to the classic confocal microscope, in which the aperture diameter of the detection pinhole aperture has hardly any effect on resolution, the size of the secondary maxima in the confocal 4-pi microscope is relatively significantly dependent on this measurement.

The method according to the invention can also be used in $I^5M$ and in wave field microscopy.

BRIEF DESCRIPTION OF THE SEVERAL VIEWS OF THE DRAWINGS

The subject matter according to the invention is schematically depicted in the diagram and is described below based on the figures, in which elements that function the same are designated with the same reference numbers. They show.

DETAILED DESCRIPTION OF THE INVENTION

Figure 1:
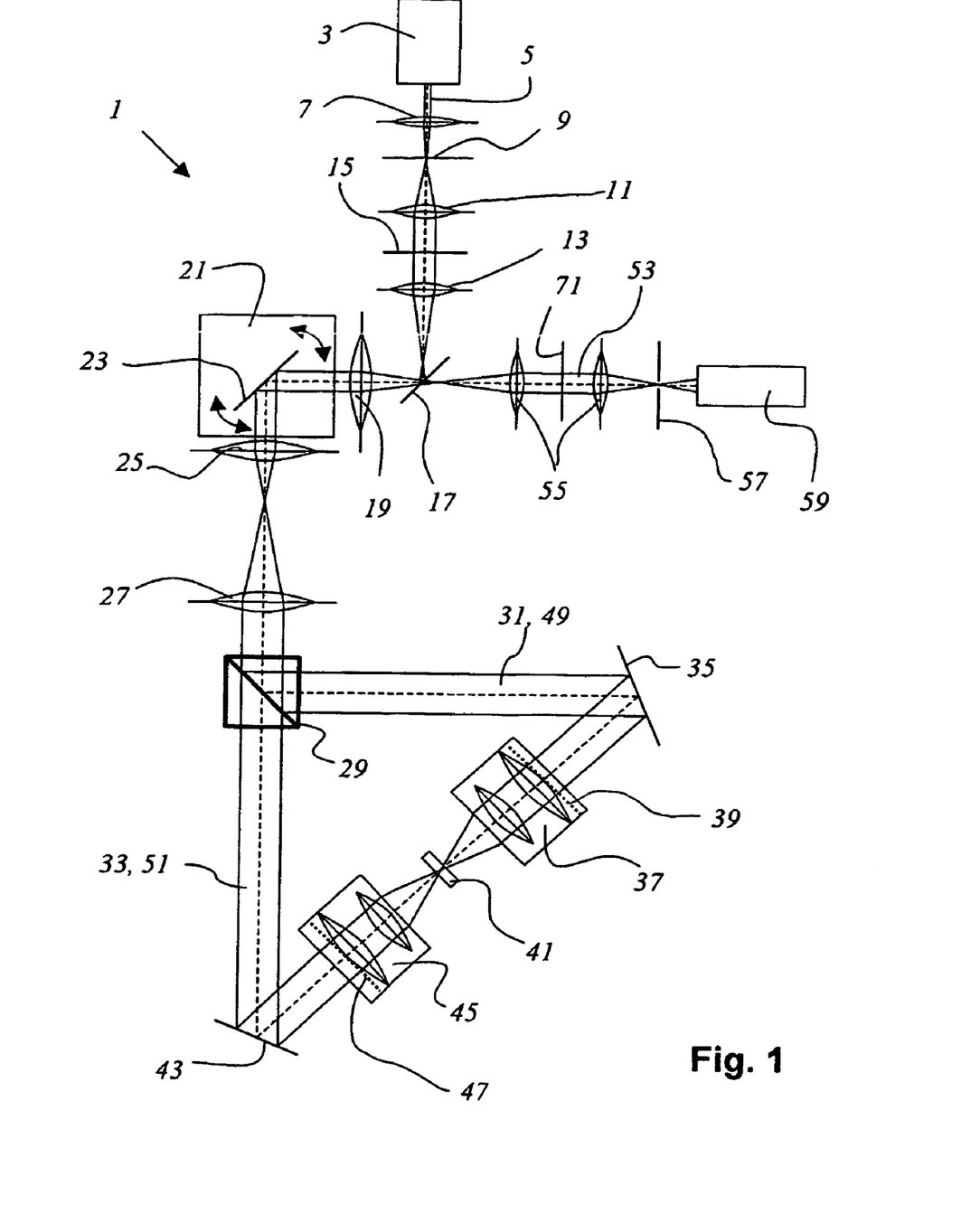
FIG. 1 a confocal 4-pi microscope according to the invention.

FIG. 1 shows a confocal 4-pi microscope 1 with a light source 3 that emits illumination light 5. The illumination light 5 is focused with the lens 7 on to the illumination pinhole aperture 9, passes through it, and then passes through the first optic 11, the second optic 13, and a pupil filter 15 that is arranged between the first optic 11 and the second optic 13. The illumination light 5 is reflected from a beam splitter 17, which is designed as a dichroic beam splitter, through the optic 19 to a beam deflector 21 that comprises a cardanically mounted scanning mirror 23. The scanning mirror 23 of the beam deflector 21 is tiltably mounted along two axes so that the illumination light can be deflected and scanned, respectively, by tilting the scanning mirror 23 appropriately. From the beam deflector, the illumination light 5 reaches the scanning optic 25 and then via a tube optic 27 reaches a further beam splitter 29 that splits the illumination light into a first partial illumination beam 31 and a second partial illumination beam 33. The first partial illumination beam 31 reaches via the first deflection mirror the first objective 37, which exhibits a first pupil 39, and which focuses the first partial illumination beam 31 onto the sample 41. The second partial illumination beam 33 reaches via the second deflection mirror 43 the second objective 45, which exhibits a second pupil 47, and which also focuses the second partial illumination beam 33 onto the sample 41 such that it interferes with the first partial illumination beam 31. The pupil filter 15 is located on a plane that corresponds optically to the pupil planes on which pupils 39, 47 are located. The detection light emitted from the sample 41 reaches the other beam splitter 29 in the form of a first partial detection beam 49 through the first objective 37 and via the first deflection mirror 35, and there interferes with the second partial detection beam 51, which reaches the other beam splitter 29 through the second objective 45 and via the second deflection mirror 43. The interfering detection light 53 is passed through the tube optic 27, the scanning optic 25, and the beam deflector 21 to the beam splitter 17, passes through it and reaches the detector 59 that comprises a photomultiplier after passing through the detection optic 55 and through the detection pinhole aperture 57, which exhibits an aperture diameter of 0.7 Airy discs. The pupil filter 15 is designed as a zone filter with three separate phase rings. The wavelength of the illumination light is 488 nm. That of the detection light is 688 nm. A further pupil filter 71 is envisaged on the beam path of the detection light 53.

Figure 2:
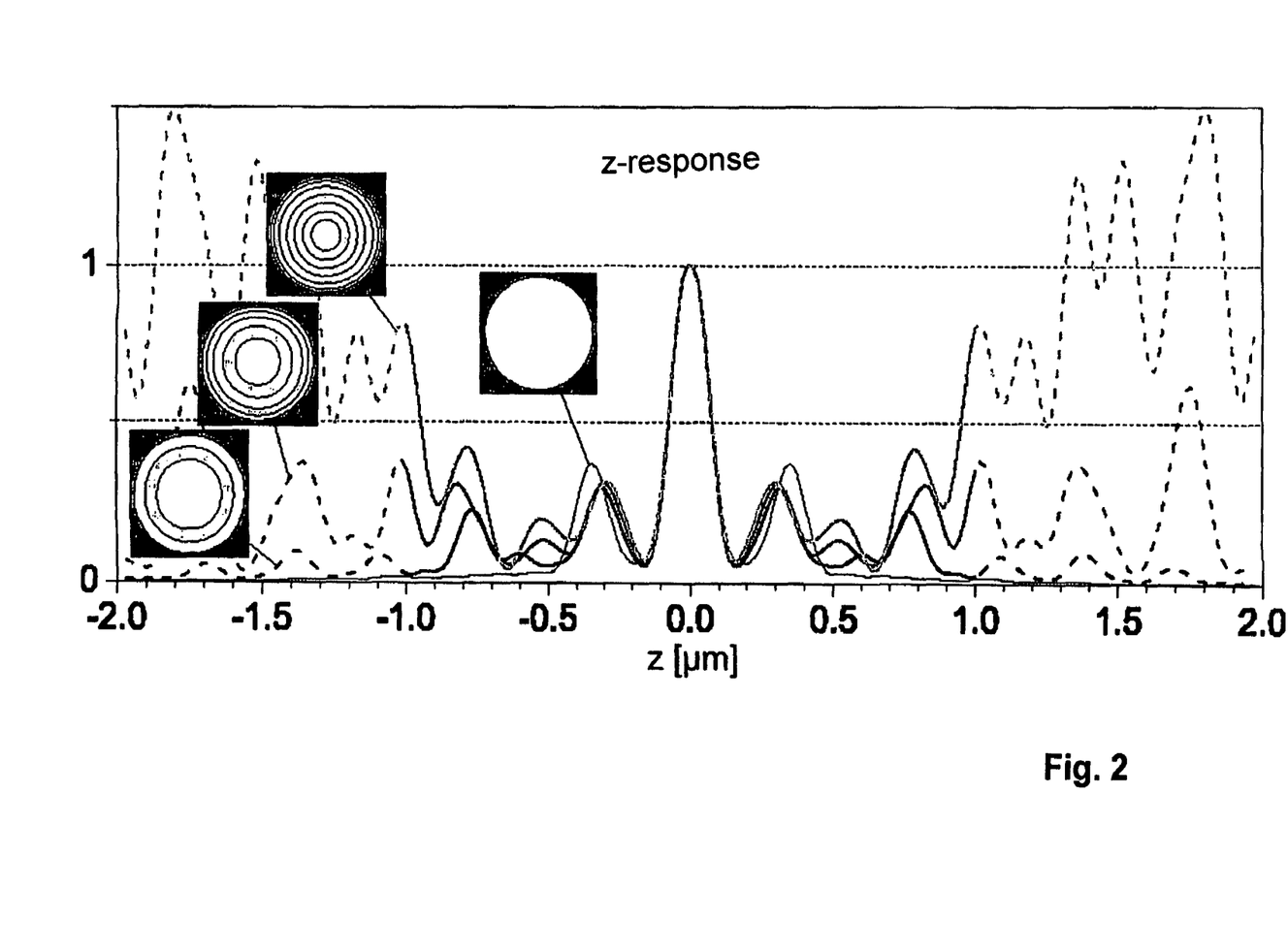
FIG. 2 z-profiles of the 4-pi confocal microscope during single-photon excitation and with a pupil filter.

FIG. 2 shows the z-responses of the 4-pi confocal microscope during single-photon excitation and with one pupil filter 15. The pupil filter 15 is located on a plane that corresponds optically to the pupil planes on which pupils 39, 47 are located. The z-responses for pupil filters with various zone numbers are depicted. The filter shown in the lower left is preferred because it exhibits low z-responses even in peripheral regions. However, peripheral regions are of no importance for very thin samples because they lie outside the sample. The profiles of phase ring filters in the excitation beam path with 1, 2, and 3 separated phase rings are depicted, as well as the reference case without pupil filters. The gray-shaded region lies outside the optimized zone. Very variable z-responses are achieved outside the optimal regions, depending on optimization. (The z-response can be misleading because in this case the individual linear points are significant and not the quadratic, as is the case when calculating delta.) Instead, the peripheral regions increase disproportionately relative to the central maximum. (Excitation wavelength 488 nm, Stokes shift 10%, infinitesimally small detection pinhole aperture, water-immersion objective with a half aperture angle of 1.1 rad.)

Figure 3:
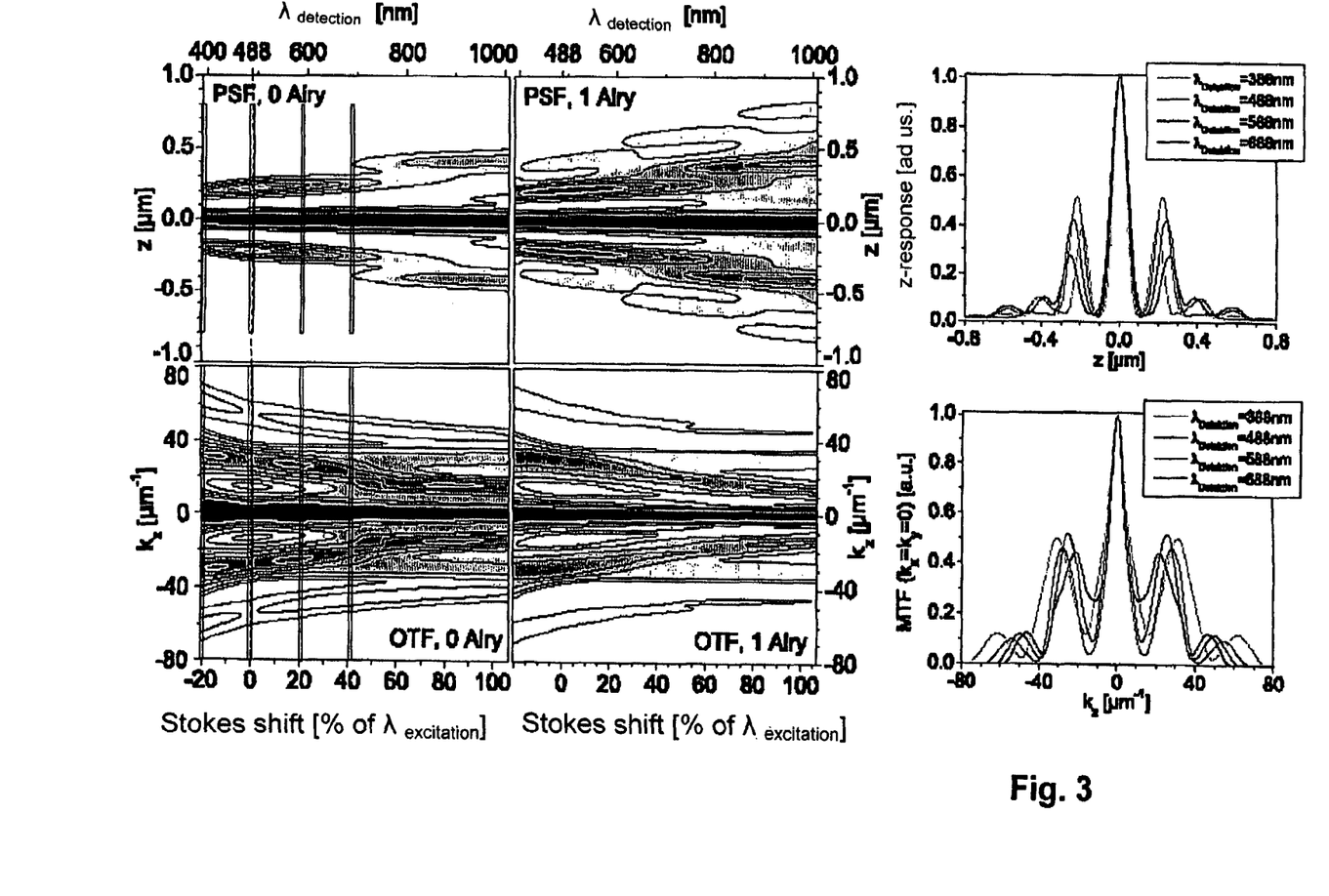
FIG. 3 theoretical OTFs and PSFs of the 4-pi confocal microscope.

FIG. 3 shows theoretical OTFs and PSFs of the 4-pi confocal microscope, depending on Stokes shift. The z-responses and profiles along the $k_z$ axis of the OTF are plotted against the detection wavelength. Each case shows a detection pinhole aperture of 0 (pinhole-shaped) and a 1 Airy disc diameter. An alpha=63° (1.1 rad), n=1.33, and in excitation wavelength of 488 nm are assumed. The values given for the relative Stokes shift also relate to this wavelength. The contour lines lie at 50% (white), 40%, 30%, 20%, 10% (broken lines), and 5% (dotted; only OTFs) of the maximum values.

Figure 4:
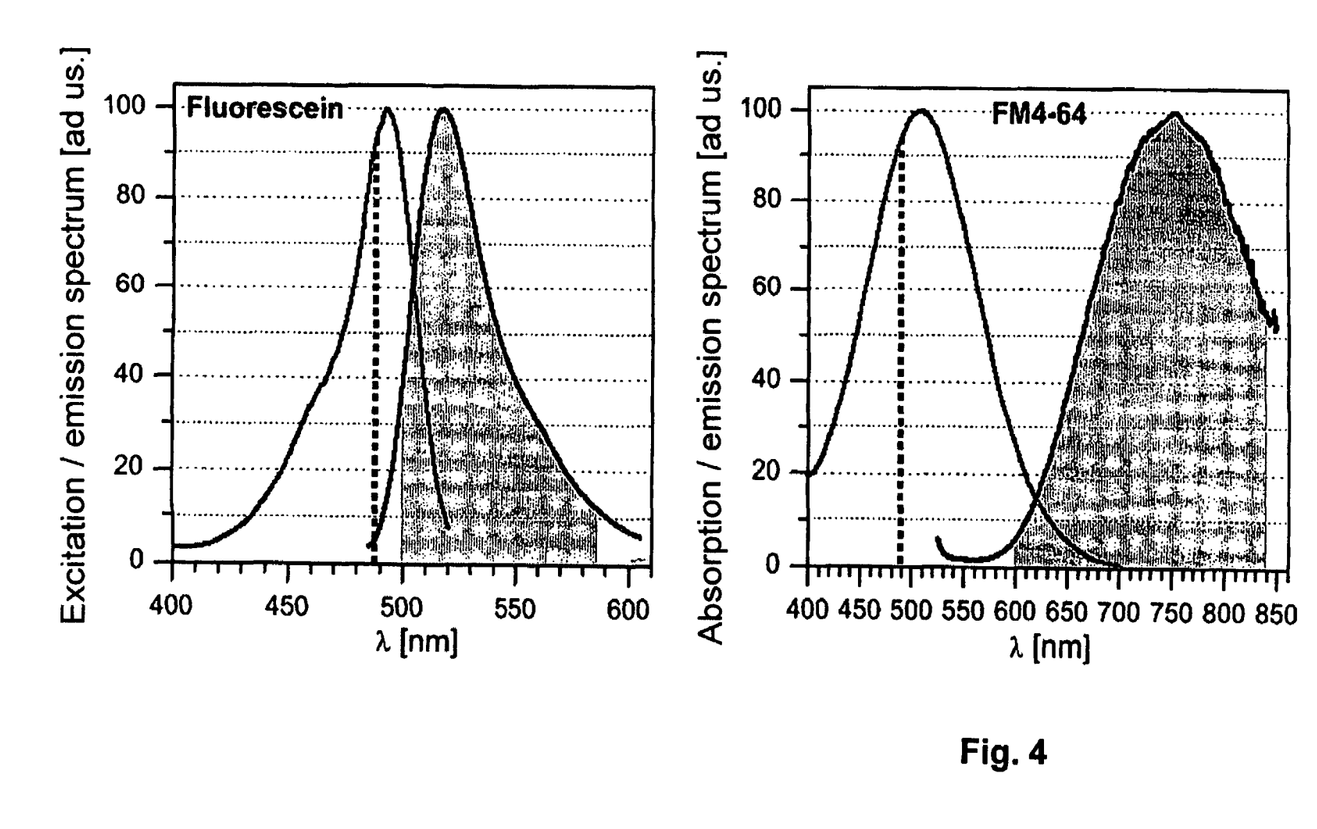
FIG. 4 shows spectra of the typical fluorescent dye fluorescein and the dye FM4-64.

FIG. 4 shows spectra of the typical fluorescent dye fluorescein and the dye FM1-64 with an extraordinarily large Stokes shift. The emission spectra are black; the excitation and absorption spectra are gray.

Figure 5:
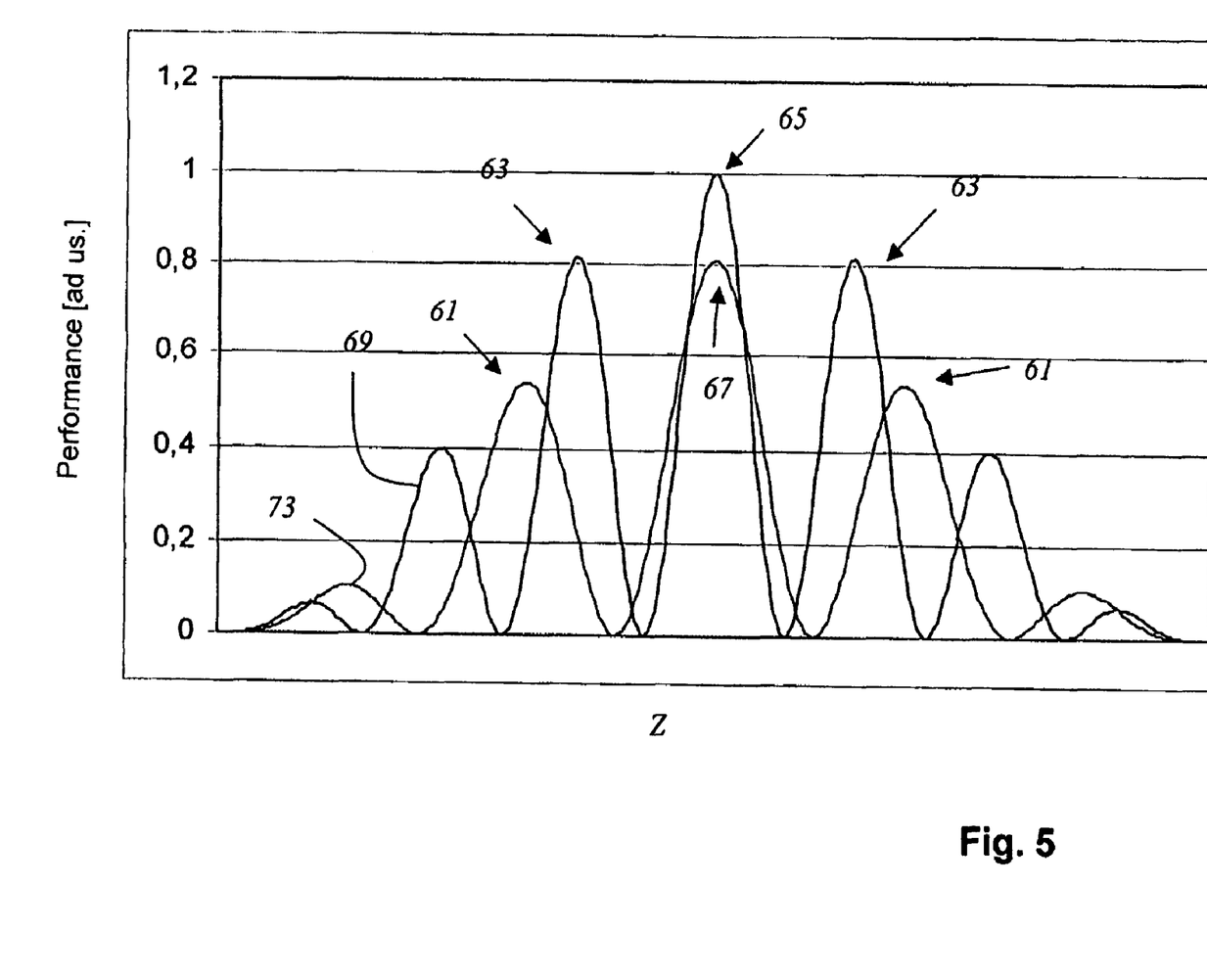
FIG. 5 a schematic of the overlapping detection minima and secondary illumination maxima according to the invention.

FIG. 5 shows a schematic of the overlapping of the detection minima 61 and the secondary illumination maxima 63 according to the invention. The main illumination maximum 65 and the main detection maximum 67 are also depicted. Z-response is the product of the first graph 69 for the illumination PSF and the second graph 73 for the detection PSF.

Figure 6:
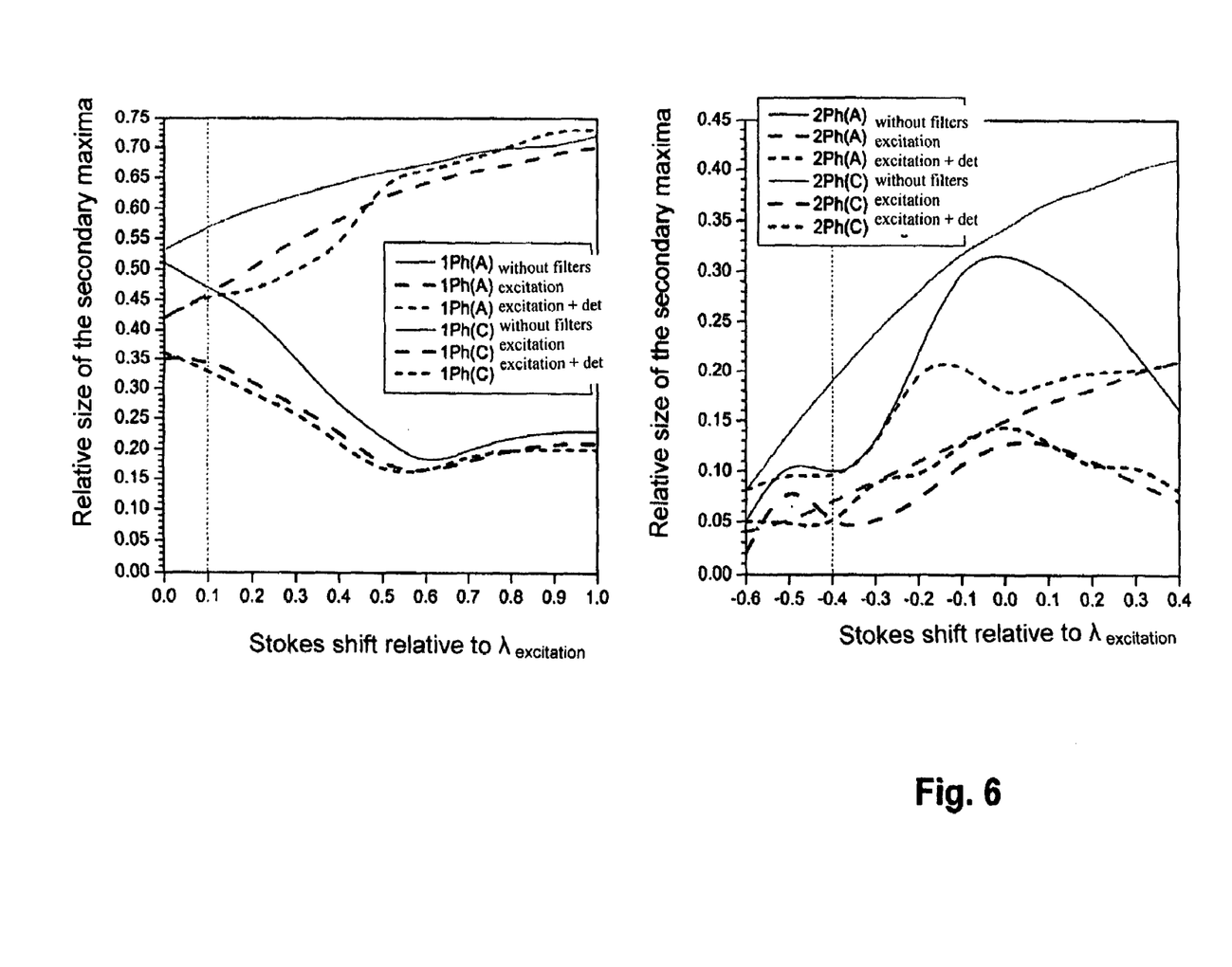
FIG. 6 the dependence of the relative size of the secondary maxima on the Stokes shift.

FIG. 6 shows the dependence of the relative size of the secondary maxima on the Stokes shift when using absorption filters (3 zones) for 4-pi types A and C in single- and two-photon excitation. The values are given relative to the size of each main maximum. In each case, the reference curve for 4-pi microscopy without pupil filters, the curve when using the filter only during excitation, and the behavior when filters are used in the excitation- and in the detection-beam path are depicted. Typical Stokes shifts are marked by vertical broken lines. For the calculation, objectives with a half aperture angle of 1.1 rad and an infinitesimally small detection pinhole aperture are assumed.

The invention has been described with reference to a particular embodiment. It is evident, however, that changes and modifications can be carried out without relinquishing the scope of protection of the claims below.

The invention claimed is:

1. A method of confocal 4-pi microscopy, comprising:
   illuminating a sample with two coherent illuminating waves of an illumination wavelength;
   producing by interference of the illuminating waves a stationary illumination wave with a main illumination maximum within the sample and secondary illumination maxima;
   the illuminating waves inducing the sample to emit detection waves of a detection wavelength; and
   producing by interference of the detection waves a detection pattern with a main detection maximum within the sample and secondary detection maxima;
   wherein the secondary illumination maxima and secondary detection maxima are located in different places; and
   wherein the location and/or intensity of at least one of the secondary illumination maxima and/or the secondary detection maxima is altered by positioning at least one Toraldo pupil filter at the optical path of at least one of the illuminating waves and/or the detection waves.

2. Method according to claim 1, wherein the sample is marked with at least one fluorescent dye.

3. Method according to claim 2, further comprising excitation of the at least one fluorescent dye by multiple-photon excitation.

4. Method according to claim 2, further comprising excitation of the at least one fluorescent dye using a Forster-resonant energy transfer (FRET).

5. Method according to claim 2, further comprising illuminating the sample with a further illuminating wave of a further illumination wavelength, and excitation of the at least one fluorescent dye via a virtual or via a real intermediate level.

6. Method according to claim 2, further comprising excitation of the at least one fluorescent dye via a higher excitation level.

7. Method according to claim 2, wherein the at least one fluorescent dye has an excitation and an emission region, and wherein the illumination wavelength is selected from the high-frequency portion of the excitation region and/or from the low-frequency portion of the emission region.

8. Method according to claim 1, wherein the illumination wavelength to detection wavelength ratio is in a range of 0.5 to 0.9.

9. Method according to claim 1, further comprising the detection waves passing through a detection aperture with a diameter smaller than 1 Airy disc.

10. Confocal 4-pi microscope
   comprising a light source capable of illuminating a sample with two coherent illuminating waves of an illumination wavelength;
   wherein the illuminating waves are capable of producing by interference a stationary illumination wave with a main illumination maximum within the sample and secondary illumination maxima;
   wherein the illuminating waves are capable of inducing the sample to emit detection waves of a detection wavelength;
   wherein the detection waves are capable of producing by interference a detection pattern with a main detection maximum within the sample and secondary detection maxima; and
   wherein the secondary illumination maxima and secondary detection maxima are located in different places;
   a detector detector detecting waves; and
   at least one Toraldo pupil filter at the optical path of at least one of the illuminating waves and/or the detection waves, the at least one Toraldo pupil filter being capable of altering the location and/or intensity of at least one of the secondary illumination maxima and/or the secondary detection maxima.

11. Confocal 4-pi microscope according to claim 10, further comprising a phase plate at the optical path of at least one of the illuminating waves and/or the detection waves.

12. Confocal 4-pi microscope according to claim 10, wherein the detection wavelength is selectable and the detector may be set to the selected detection wavelength.

13. Confocal 4-pi microscope according to claim 10, wherein the illumination wavelength is selectable, and the light source can be set to the selected illumination wavelength.

14. Confocal 4-pi microscope according to claim 10, wherein the sample is marked with at least one fluorescent dye.

15. Confocal 4-pi microscope according to claim 14, wherein the light source is a laser, and wherein excitation of the at least one fluorescent dye is achieved by multiple-photon excitation.

16. Confocal 4-pi microscope according to claim 14, wherein excitation of the at least one fluorescent dye comprises Forster-resonant energy transfer (FRET).

17. Confocal 4-pi microscope according to claim 14, wherein the sample is illuminated with a further illumination wave of a further illumination wavelength and excitation of the at least one fluorescent dye occurs via a virtual or via a real intermediate level.

18. Confocal 4-pi microscope according to claim 14, wherein excitation of at least one fluorescent dye occurs via a higher excitation level.

19. Confocal 4-pi microscope according to claim 14, wherein the at least one fluoresce dye has an excitation and an emission region, whereby the illumination wavelength lies within the high-frequency portion of the excitation region and/or the detection wavelength within the low-frequency portion of the emission region.

20. Confocal 4-pi microscope according to claim 10, wherein the illumination wavelength to detection wavelength ratio is in a range from 0.5 to 0.9.

21. Confocal 4-pi microscope according to claim 10, further comprising a detection aperture having an aperture diameter smaller than 1 Airy disc, the detection waves passing through the detection aperture.

* * * * *